SHEET METAL SHEARING MACHINE
Filed Oct. 28, 1966 3 Sheets-Sheet 1
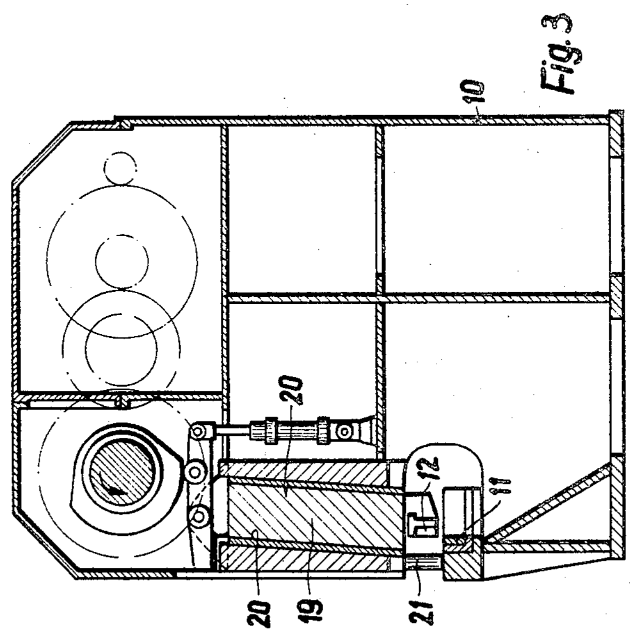
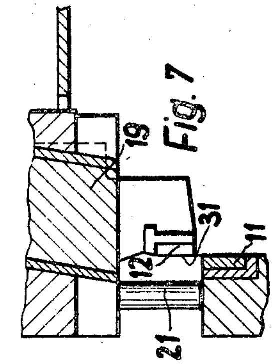
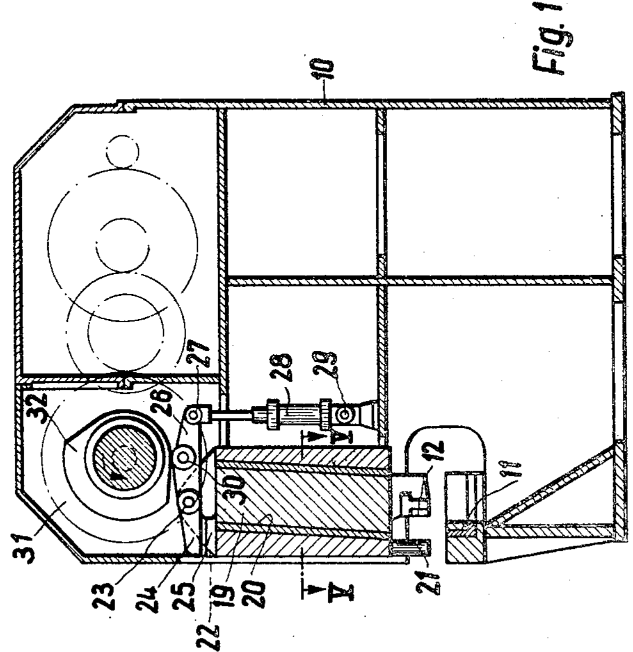
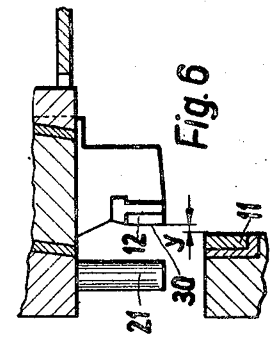

10
17
15
14
13
16
11
12
19
18

10
II
13
18
I
19

10
11
12
23
24
25
19
S 19
12
11
21
S

United States Patent Office 3,398,621

Patented Aug. 27, 1968

3,398,621
SHEET METAL SHEARING MACHINE

Ernst Theodor Sack, Hosel, Germany, assignor to Maschinenfabrik Sack G.m.b.H., Dusseldorf-Rath, Germany Filed Oct. 28, 1966, Ser. No. 590,316
4 Claims. (Cl. 83—454)

In the operation of shearing machines for sheet metal the best size of gap to use between the cutting planes of the two blades depends on the thickness of the sheet being cut in that the blade gap should be greater the thicker the sheet. To satisfy this requirement one of the blades is so mounted that its position can be adjusted at right angles to the plane of cut. However the effectiveness in practice of this adjustment facility depends on the reliability of the operator. If he forgets to adjust the gap when changing over to a different sheet thickness the resulting cuts are untidy and blade wear is increased.

The object of the invention is to provide a shearing machine for sheet metal in which the blade gap is adjusted automatically to suit the thickness of the sheet material for cutting. The basic idea is to use the hold-down, whose position in operation depends on the sheet thickness, to adjust automatically the blade gap between the travelling blade and the stationary blade during the cutting operation. This is done according to the invention by providing a sheet metal shearing machine comprising a travelling blade, a stationary blade and a hold-down, wherein the travelling blade carrier slides parallel to the plane of cut in a slide on which the hold-down is mounted and which slides in a guide in a direction parallel to the line of cut but inclined the direction of the cutting movement and is driven through a frictional connection the arrangement being such that during a shearing operation the slide moves until the hold-down engages the sheet metal thus setting the gap between the blades whereafter the travelling blade moves in the slide to make a cut.

With this arrangement the travelling blade in its downward movement first of all follows a path slightly inclined to the cutting plane, but as soon as the hold-down makes contact the travelling blade is deflected in direction into the plane of cut. Thus at the instant of this deflection the blade gap is determined. The amount of the blade gap therefore depends on how soon the hold-down is brought to a standstill in its downward movement, and consequently the blade gap is a function of sheet thickness, as required.

In a preferred version of the invention the frictional connection is effected by a prestressed, elastically yielding intermediate member. However other versions are possible which do not include an intermediate member of this kind.

The guiding and deflecting of the travelling blade holder by the hold-down can also be utilized for the further purpose of preventing rubbing between the cut surface of the sheet and the flank of the travelling blade when the latter returns to its initial position after completion of the cut. For this purpose the movement of the hold-down can be so arranged that after completion of the cut the hold-down lifts at the latest at the instant when the travelling blade reverses in direction. This gives the travelling blade a component of movement in a direction at right angles to the plane of cut, whereby the two surfaces no longer rub against each other but are separated.

The elastically yielding intermediate member, which allows the drive for the hold-down to continue in its movement, after the hold-down has itself been brought to rest, preferably consists of a cam follower lever which is mounted on the slide supporting the hold-down, and takes support with its one arm against the slide and with its other arm through a yielding hydraulic ram against a fixed point, the second arm of the cam follower lever being acted on by a driving cam. The yielding hydraulic can if desired be replaced by a prestressed spring. However a hydraulic ram which is constantly under pressure is preferred.

In regard to adjustability of blade gap in function of sheet thickness the invention is important particularly for guillotine shears, but the invention is not limited to this application. The invention can for example be applied to trimming shears, where it is particularly important to prevent or at least decreases rubbing between the cut sheet and the returning blade.

One example of a shearing machine in which the upper blade travels and the lower blade is stationary, and constructed in accordance with the invention is illustrated in the accompanying drawings, in which:

FIGURE 1 is a section along the line I—I of FIGURE 5 through the machine with the blades and the hold-down in their initial positions;

FIGURES 3 and 4 are sections corresponding to FIGURE 1, but with the machine in different working positions;

FIGURES 6 to 8 are enlarged views of the blade and the hold-down, in different working positions.

Figure 2:
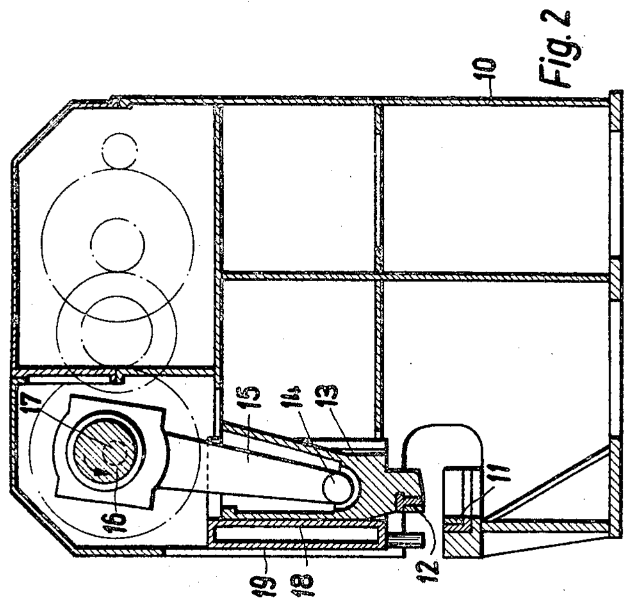
FIGURE 2 is a section parallel to the section of FIGURE 1 and taken along the line II—II of FIGURE 5, to show the drive for the upper blade.

A frame 10 of the shearing machine shown supports a lower fixed blade 11 and guides for an upper movable blade 12, and also supports the drive for the upper blade. The upper blade is mounted in a blade slide 13 connected by a pivot 14 to a connecting rod 15, which is driven by an eccentric 16 mounted on a shaft 17, which is itself driven through gearwheels by a motor not shown in the drawing.

Figure 5:
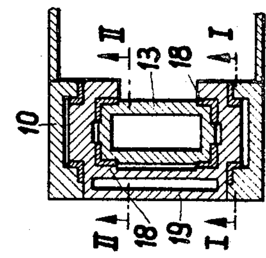
FIGURE 5 is a cross-section along the line V—V of FIGURE 1, drawn to a larger scale.

The blade slide 13 is guided by vertical surfaces 18 of a hold-down slide 19 which surrounds the blade slide 13, as shown in FIGURE 5. The hold-down slide 19 is itself guided on guide surfaces 20 mounted in the frame of the machine and inclined slightly relative to the cutting plane. Thus when the hold-down slide 19 is stationary, the blade slide 13 moves up and down on a perfectly vertical path. On the other hand if at any instant the hold-down slide 19 is itself moving, then the path of movement of the blade slide 13 is also inclined to the vertical. The hold-down, in the form of several studs 21, is fixed firmly to the lower end of the hold-down slide 19.

At its upper end the hold-down slide 19 has eyes 22 between which there is pivoted a cam follower lever 23. When the machine is in the positions shown in FIGURES 1, 2 and 3, the left-hand arm 24 of the follower lever rests in contact with a mechanical stop fixed to the upper end of the hold-down slide 19. This mechanical stop can be seen more clearly in FIGURE 4, where the arm 24 has lifted away from the stop. The end of the right-hand arm 26 of the cam follower lever 23 is pivoted at 27 to a hydraulic ram 28 which is pivoted at 29 to the frame 10 of the machine. On the arm 26 there is also a cam follower roller 30 which rests against the surface 31 of a cam 32, which is mounted on the shaft 17, on which is also mounted an eccentric 16. The hydraulic ram 28 constantly supplies enough thrust to keep the roller 30 in contact with the cam surface 31, against the influence of the weight of the hold-down slide 19.

When the machine is in its initial position, as shown in FIGURES 1, 2 and 6, the two vertical blade planes are separated by the distance *y* shown in FIGURE 6.

As soon as the drive shaft 17 begins to rotate in the direction of the arrow, the two slides, that is to say the hold-down slide 19 and the blade slide 13, begin to move together downwards bringing the cutting edge 30 of the upper blade 12 into movement downwards along a path inclined to the vertical, that is to say the upper blade approaches the lower blade along an inclined path. As soon as the hold-downs 21 make contact the downward movement of the hold-down slide 19 ceases. The cam 32 can nevertheless continue to rotate because the hydraulic ram 28 yields, the left arm 24 of the cam follower lever 23 lifting from the mechanical stop 25.

When the hold-down slide 19 has been brought to a standstill in this way the blade slide 13 moves downwards on a vertical path. If there is no sheet resting on the lower blade at this time, then at the instant when the hold-downs come to rest the upper blade is in the position shown in FIGURES 3 and 7, that is to say the vertical planes containing the two blades are separated only by the very small gap which is always necessary and which is so small that it does not appear in the drawings. In practice this is the gap which is used for cutting very thin sheet.

Figure 4:
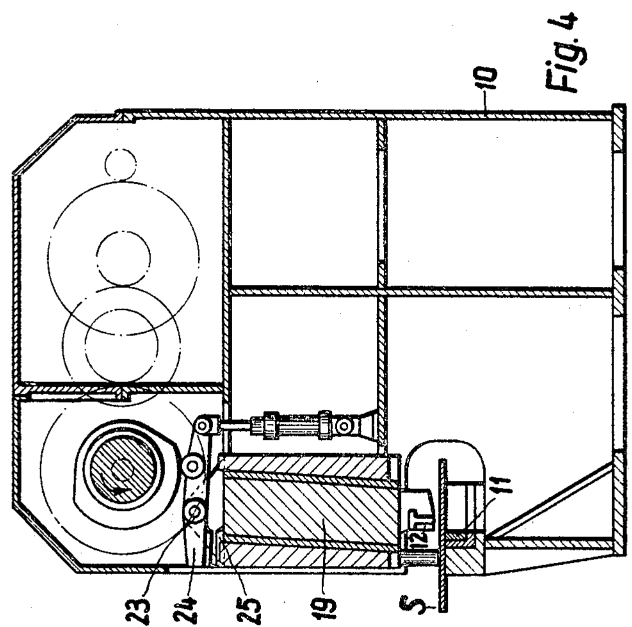
Figure 8:
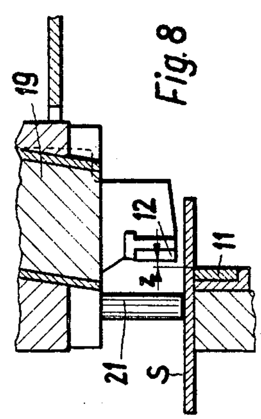

On the other hand if there is a sheet resting on the lower blade, as shown at S in FIGURES 4 and 8, then the hold-down slide in its downward movement is brought to *a* to be cut. Under these circumstances the upper blade in its downward movement ceases earlier to move on an inclined path and begins to move downwards vertically before the plane containing its cutting edge 30 has come very close to the vertical plane containing the lower blade. At this instant the two vertical blade planes are separated by the gap *z* shown in FIGURE 8, and this is the blade gap required for cutting this thickness of sheet. In this way there is obtained the entirely automatic adjustment of blade gap to suit sheet thickness intended by the present invention.

The shape of the cam 32 is such that the hold-down studs 21 lift off from the surface of the sheet, after completion of the cut, at the latest at the instant when the upper blade reverses its direction of movement to begin its return stroke. The hold-down slide 19 then begins moving upwards, giving the blade slide 13 a horizontal component of movement which separates the flank 31 of the upper blade from the cut surface of the sheet, so that undesirable rubbing between the blade and the cut surface of the sheet is prevented, and so that a thin sheet is not dragged along by the blade and thus permanently deformed.

Figure 9:
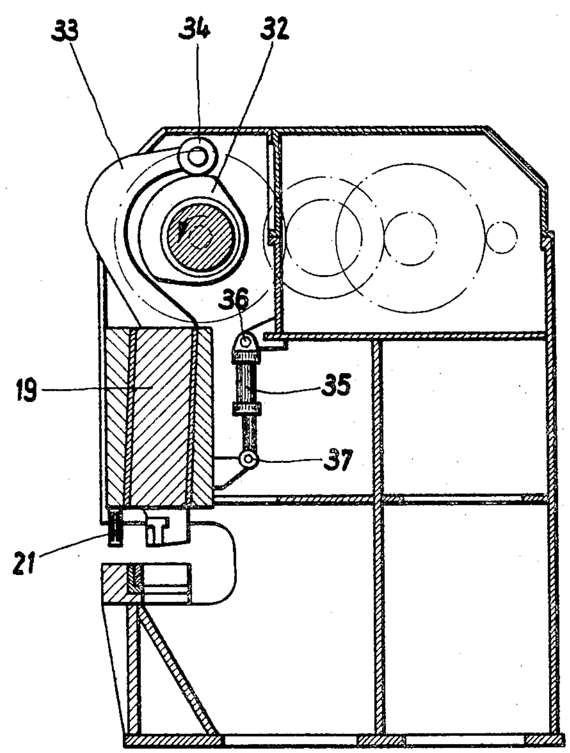
FIGURE 9 is a section, similar to FIGURE 1, but showing a modification of the machine.

The modification shown in FIGURE 9 demonstrates that the frictional connection between the hold-down slide 19 and the cam 32, acting through the cam follower lever 23, is not absolutely necessary. In this variant the upper end of the hold-down slide 19 has an arm 33 which goes around the cam 32 and carries on its end a cam follower roller 34 which rests in contact at the top with the cam 32. A hydraulic ram 35 is pivoted at 36 to the frame of the machine and at 37 to the hold-down slide 19. The ram tends to push the hold-down slide downwards. Functionally there is no difference between this variant and the version of FIGURES 1 to 8. As soon as the hold-downs 21 come to rest on the surface of the sheet the downward movement of the hold-down slide 19 stops, the roller 34 is lifted by the cam 32 and the blade slide now continues moving downwards on a vertical path and completes the cut. The thrust applied by the hold-downs to the sheet derives from the hydraulic ram.

I claim:

1. In a sheet metal shearing machine of the kind comprising a travelling blade, a stationary blade, and means for adjusting the gap between said travelling and stationary blades in a direction perpendicular to the plane of cut; the improved gap adjusting means which comprises a hold-down carrier, at least one hold-down mounted on said hold-down carrier, means slidably mounting said hold-down carrier for movement to and fro along a path parallel to the line of cut but inclined to said plane of cut, means driving said hold-down carrier along said path, a frictional connection interconnecting said drive means and said hold-down carrier, a carrier for said travelling blade, and means slidably mounting said travelling blade carrier for movement relatively to said hold-down carrier in a direction parallel to said cutting plane, whereby during a shearing operation said hold-down carrier moves until said hold-down engages the sheet metal workpiece thus setting said gap between said blades whereafter said travelling blade and travelling blade carrier move relatively to said hold-down carrier to make said cut.

2. A machine according to claim 1, wherein said frictional connection consists of a prestressed elastically yielding intermediate member.

3. A machine according to claim 1, further comprising means determining the movement of said hold-down carrier whereby when said cut has been completed said hold-down retracts from said workpiece at the latest at the instant when said travelling blade initiates its idle stroke.

4. A machine according to claim 1, further comprising a cam follower lever, means mounting said lever on said hold-down carrier, an arm of said lever adapted to bear against said hold-down carrier, a yielding hydraulic ram, a second arm of said lever adapted to bear through said ram against a fixed point, and a driving cam acting on said second arm of said lever.

References Cited

UNITED STATES PATENTS 3,242,786 3/1966 Giordano ------------ 83—640

JAMES M. MEISTER, *Primary Examiner.*